United States Patent [19]

Ibenthal

[11] Patent Number: 6,069,661
[45] Date of Patent: May 30, 2000

[54] METHOD AND ARRANGEMENT FOR COMPUTING PIXEL VALUES OF PIXELS OF A DIGITAL PICTURE SIGNAL THAT ARE ARRANGED OUTSIDE A TWO-DIMENSIONAL SCANNING RASTER

[75] Inventor: Achim Ibenthal, Elmshorn, Germany

[73] Assignee: U.S. Philips Corporation, New York, N.Y.

[21] Appl. No.: 09/070,218

[22] Filed: Apr. 30, 1998

[30] Foreign Application Priority Data

May 2, 1997 [DE] Germany ................. 197 18 657

[51] Int. Cl.[7] .................................................. H04N 7/01
[52] U.S. Cl. .................................. 348/441; 382/300
[58] Field of Search ........................ 348/441, 581, 348/571, 625; 382/250, 278, 298–300, 260

[56] References Cited

U.S. PATENT DOCUMENTS

| | | | |
|---|---|---|---|
| 5,185,817 | 2/1993 | Degi et al. ........................ | 382/47 |
| 5,373,375 | 12/1994 | Weldy ................................ | 358/523 |
| 5,513,281 | 4/1996 | Yamashita et al. ............... | 382/278 |
| 5,587,742 | 12/1996 | Hau et al. ......................... | 348/441 |
| 5,778,101 | 7/1998 | Hwang .............................. | 382/250 |
| 5,790,714 | 8/1998 | McNeil et al. ................... | 382/300 |
| 5,808,688 | 9/1998 | Sung ................................. | 348/441 |
| 5,854,656 | 12/1998 | Noggle ............................. | 348/441 |
| 5,889,895 | 3/1999 | Wong et al. ...................... | 382/300 |

FOREIGN PATENT DOCUMENTS

0660514A1 6/1995 European Pat. Off. .

Primary Examiner—Victor R. Kostak

[57] ABSTRACT

A method and arrangement for computing values of pixels arranged outside a 2-dimensional scanning raster of pixels having pixel values of a digital picture signal, where at least 3 of 4 reference pixels arranged around the searched pixel are determined for computing a searched pixel value $s_i(x_0+\Delta x, y_0+\Delta y)$. A polynomial $p(x,y)$ in the form $c_{m-1}x^{am-1}y^{bm-1}+c_{m-2}x^{am-2}y^{bm-2}+\ldots+c_2x+c_1y+c_0$ is constituted corresponding to their values. Next, k 1st derivatives $\delta s(x,y)/\delta x$ in the x-direction and $\delta s(x,y)/\delta x$ in the y-direction are formed from at least one of the reference pixel values. Then, a matrix is formed whose elements consist of the values of the basic functions $x^{am-1}y^{bm-1}, x^{am-2}y^{bm-2}, \ldots$ x,y,1 of the polynomial at at least 3 of the reference pixels and the k 1st derivatives $\delta p(x,y)/\delta x$ in the x-direction and $\delta p(x,y)/\delta y$ in the y-direction of the basic functions at at least one of the reference pixel values. The basic functions are allocated to a reference pixel or a 1st derivative of a reference pixel in one matrix row. An inverse or pseudo-inverse matrix is formed from the matrix by means of inversion and multiplied by an observation vector for determining the polynomial coefficients $c_{m-1}$ through $c_0$. The polynomial coefficients are introduced into polynomial $p(x,y)$ and the new pixel value $s_i(x_0+\Delta x, y_0+\Delta y)$ is computed from the function value of the polynomial $p(\Delta x, \Delta y)$ at the location $(\Delta x, \Delta y)$.

7 Claims, 3 Drawing Sheets

METHOD AND ARRANGEMENT FOR COMPUTING PIXEL VALUES OF PIXELS OF A DIGITAL PICTURE SIGNAL THAT ARE ARRANGED OUTSIDE A TWO-DIMENSIONAL SCANNING RASTER

BACKGROUND OF THE INVENTION

The invention relates to a method and an arrangement for computing values $s_i(x_0+\Delta x, y_0+\Delta y)$ of pixels which are arranged outside a two-dimensional scanning raster $\{x_0 \pm n, y_0 \pm m,$ with $m,n=0,1,2,3,\ldots\}$ of pixels having pixel values $s(x_0 \pm n, y_0 \pm m)$ of a digital picture signal.

In such methods and arrangements for computing new pixel values, it is important to determine the values of pixels which are located outside a two-dimensional scanning raster. The known pixels are situated at locations $(x_0 \pm n, y_0 \pm m)$ in which m and n are integers of zero up to a maximal value. The pixels of a digital picture signal which are located in this scanning raster have known pixel values. By way of non-limitative example, it is herein assumed that the distance between two adjacent pixels is 1 in the horizontal and vertical directions.

For example, for the purpose of television signal conversion, conversion between different graphic modes in PCs, video data compression, or for medical applications, it is often desirable or necessary to determine pixel values of pixels which are not located at the predetermined points on the two-dimensional scanning raster but are located between these points. Fundamentally, the searched pixel values may have arbitrary positions between the points on the scanning raster. This complicates their computation.

In the state of the art, methods are known which are based on bilinear or bicubic interpolation for computing such new pixel values in their simplest case. In bilinear interpolation, a linear weighting of the four pixels located closest to a searched pixel in the scanning raster is performed. In the interpolation by means of cubic B-splines, an ideal interpolation filter is approximated by means of a sin(x)/x-shaped pulse response for the one-dimensional case by means of a 3rd-order polynomial, which minimizes the interpolation error, but strongly reduces the resolution. Cf. K. Pratt: "Digital Image Processing", second edition, pp. 114 etc.

For computing new pixel values, it is further possible to perform a combined up and down-sampling.

EP-A-660 514 discloses a filter which operates as a one-dimensional polynomial interpolator and in which a one-dimensional polynomial is set up which should approximate the pixel values located outside a one-dimensional scanning raster as satisfactorily as possible.

SUMMARY OF THE INVENTION

It is an object of the invention to provide a method and an arrangement allowing the computation of pixels which are located outside a two-dimensional scanning raster. The computation should be as accurate as possible and yet performed with a reasonable number of components.

For a method according to the invention, this object is solved in that for computing a searched pixel value $s_i(x_0+\Delta x, y_0+\Delta y)$, at least three pixel values $s(x_0,y_0)$, $s(x_0,y_0+1)$, $s(x_0+1,y_0)$ and $s(x_0+1,y_0+1)$ of four reference pixels arranged around the searched pixel are determined, a polynomial $p(x,y)$ of the form $$p(x,y)=c_{m-1}x^{am-1}y^{bm-1}+c_{m-2}x^{am-2}y^{bm-2}+\ldots+c_2 x+c_1 y+c_0$$

is constituted which, at the positions of at least three of the four reference pixels, should correspond to their values, so that $p(0,0)=s(x_0,y_0)$, $p(1,0)=s(x_0+1,y_0)$, $p(0,1)=s(x_0,y_0+1)$ and/or $p(1,1)=s(x_0+1,y_0+1)$, the k first derivatives $\delta s(x,y)/\delta x$ in the x-direction and $\delta s(x,y)/\delta y$ in the y-direction are formed from at least one of the reference pixel values, a matrix is formed, whose elements consist of the values of the basic functions $$x^{am-1}y^{bm-1}, x^{am-2}y^{bm-2}, \ldots, x, y, 1$$

of the polynomial at at least three of the reference pixels and the k first derivatives $\delta p(x,y)/\delta x$ in the x-direction and $\delta p(x,y)/\delta y$ in the y-direction of the basic functions at least one of the reference pixels, the basic functions allocated to a reference pixel or to a first derivative of a reference pixel being in one row of the matrix, an inverse or pseudo-inverse matrix is formed from the matrix by means of inversion, the inverse or pseudo-inverse matrix is multiplied by an observation vector for determining the polynomial coefficients $c_{m-1}, c_{m-2}, \ldots, c_2, c_1, c_0$, which vector comprises as elements at least three of the reference pixel values and the k first derivatives $\delta s(x,y)/\delta x$ in the x-direction and $\delta s(x,y)/\delta y$ in the y-direction of at least one of the reference pixels, the polynomial coefficients are introduced into the polynomial $p(x,y)$ and the new pixel value $s_i(x_0+\Delta x, y_0+\Delta y)$ is computed by computing the function value of the polynomial $p(\Delta x, \Delta y)$ at the location $(\Delta x, \Delta y)$.

In the method according to the invention, a polynomial is set up which maximally approximates the values of four pixels which are located in the two-dimensional scanning raster and whose values are known. Moreover, the polynomial should maximally approximate the $k^{th}$ derivatives of these pixels. Such a computed polynomial allows a reasonably accurate determination of pixel values which are arranged in the square between the four known pixels.

For a searched pixel value $s_i(x_0+\Delta x, y_0+\Delta y)$, the values of four reference pixels arranged around this searched pixel are first determined. These are the pixels which are closest to the searched pixel in the two-dimensional scanning raster and whose values are known. A polynomial of the above-mentioned form is set up, which, as a target, should maximally approximate the pixel values of these four reference pixels.

For example, for the reference pixel value $s(x_0,y_0)$, the polynomial should yield its pixel value when the values 0 for x and 0 for y are introduced in the polynomial. The polynomial should yield the reference pixel value $s(x_0+1,y_0)$ when the values 1 for x and 0 for y are introduced in the polynomial. A corresponding situation is valid for the two further reference pixel values.

The k first derivatives $\delta s(x,y)/\delta x$ and $\delta s(x,y)/\delta y$ are formed from at least one of the reference pixel values. The polynomial should maximally approximate also these values of the derivatives so that the derivative of the polynomial for each pixel is equal to the corresponding derivative of the pixel value itself.

It is generally sufficient when the first derivatives in the x and y-directions are formed for one of the reference pixels and when the polynomial for one of these reference pixel values maximally approximates its derivative.

The above polynomial is initially present in a general form; for computing the searched pixel value $s_i(x_0+\Delta x, y_0+\Delta y)$, particularly the polynomial coefficients $c_{m-1}, c_{m-2}, \ldots, c_2, c_1, c_0$ are to be determined. To this end, a matrix is formed whose values only consist of the basic functions of the polynomial. In this matrix, the polynomial coefficients thus do not occur but only the other elements of the polynomial occur. The polynomial is then set up for at least three of the reference pixel values and for the first derivatives in the x and y-directions at at least one of the reference pixel values. The basic functions are set up within the matrix in such a way that, within a row of the matrix, the basic functions allocated to one reference pixel value or to a first derivative of a reference pixel value are arranged in the same sequence as in the polynomial. Thus, the basic functions of the polynomial of at least three of the reference pixel values and of at least the first derivatives in the x and y-directions of at least one of the reference pixel values are line-sequentially present within the matrix.

An inverse or pseudo-inverse matrix which is multiplied by means of an observation vector is formed from this matrix by means of inversion. The observation vector line-sequentially has the corresponding values of the reference pixels themselves and the corresponding derivatives of the reference pixels. The lines within the vector and within the inverse matrix are allocated to the same reference pixels or reference pixel derivatives.

The polynomial coefficients $c_{m-1}, c_{m-2}, \ldots, c_2, c_1, c_0$ are computed by multiplying the inverse matrix by the observation vector.

The polynomial coefficients can now be introduced into the polynomial $p(x,y)$.

The values $\Delta x$ and $\Delta y$ are introduced into the polynomial for the searched pixel value $s_i(x_0+\Delta x, y_0+\Delta y)$. The polynomial is now computed and yields, as a result, the searched pixel value $s_i(x_0+\Delta x, y_0+\Delta y)$.

A very good approximation of the searched pixel value is found by means of this two-dimensional polynomial computation of this value. Nevertheless, the number of components required for the computation remains reasonable, because some of the above-mentioned computation steps do not need to be repeated for each pixel value. Only the new values to be introduced for the reference pixels and their first derivatives are to be determined each time. The polynomial in its basic form, as well as the inverse matrix, are, however, maintained for changing ($\Delta x, \Delta y$). Moreover, the polynomial values $p(0,0)$, $p(1,0)$, $p(0,1)$ and $p(1,1)$ remain identical because the searched pixel value is introduced in such a way that it is arranged at the location $x_0+\Delta x$ and $y_0+\Delta y$. Independent of the fact where the searched pixel value is arranged in a two-dimensional raster, the quadrant of reference pixel values is always set up with these values, while only the relative location within this quadrant is re-introduced by the values $\Delta x$ and $\Delta y$ for the searched pixel value.

An embodiment of the invention is characterized in that for forming the matrix, the first derivatives $\delta p(x,y)/\delta x$ in the x-direction and $\delta p(x,y)/\delta y$ in the y-direction are formed from one of the reference pixel values, preferably the reference pixel value $s(x_0,y_0)$, and that the observation vector comprises the four reference pixel values $s(x_0,y_0)$, $s(x_0,y_0+1)$, $s(x_0+1,y_0)$ and $s(x_0+1,y_0+1)$ and the first derivatives $\delta s(x,y)/\delta x$ in the x-direction and $\delta s(x,y)/\delta y$ in the y-direction of one of the reference pixels, preferably the reference pixel value $s(x_0,y_0)$.

For the computation explained above, it is fundamentally sufficient to take the four reference pixel values and the first derivatives in the x and y-directions of one of the reference pixel values into account. In this case, already very good approximations of the searched pixel value are obtained, without using elaborate computations.

According to the invention, the object mentioned hereinbefore is solved for an arrangement in that first computing means are provided, which
constitute a polynomial $(p(x,y))$ of the form $$p(x,y)=c_{m-1}x^{am-1}y^{bm-1}+c_{m-2}x^{am-2}y^{bm-2}+\ldots+c_2 x+c_1 y+c_0$$

which, at the positions of at least three of the four reference pixels should correspond to their values, so that $p(0,0)=s(x_0,y_0)$, $p(1,0)=s(x_0+1,y_0)$, $p(0,1)=s(x_0,y_0+1)$ and/or $p(1,1)=s(x_0+1,y_0+1)$, form a matrix whose elements consist of the values of the basic functions $$x^{am-1}y^{bm-1}, x^{am-2}y^{bm-2}, \ldots, x, y, 1$$

of the polynomial at at least three of the reference pixels and the k first derivatives $\delta p(x,y)/\delta x$ in the x-direction and $\delta p(x,y)/\delta y$ in the y-direction of the basic functions at least one of the reference pixels, the basic functions allocated to a reference pixel or to a first derivative of a reference pixel being in one row of the matrix, form an inverse or pseudo-inverse matrix from the matrix by means of inversion, differentiators are provided which form the k first derivatives $\delta s(x,y)/\delta x$ in the x-direction and $\delta s(x,y)/\delta y$ in the y-direction from at least one of the reference pixel values, second computing means are provided, which
for computing a searched pixel value $s_i(x_0+\Delta x, y_0+\Delta y)$, receive at least three pixel values $s(x_0,y_0)$, $s(x_0,y_0+1)$, $s(x_0+1,y_0)$ and $s(x_0+1,y_0+1)$ of four reference pixels arranged around the searched pixel, multiply the inverse or pseudo-inverse matrix by an observation vector for determining the polynomial coefficients $c_{m-1}, c_{m-2}, \ldots, c_2, c_1, c_0$, which vector comprises as elements at least three of the reference pixel values and the k first derivatives $\delta s(x,y)/\delta x$ in the x-direction and $\delta s(x,y)/\delta y$ in the y-direction of at least one of the reference pixels, and introduce the polynomial coefficients into the polynomial $p(x,y)$ and compute the new pixel value $s_i(x_0+\Delta x, y_0+\Delta y)$ by computing the function value of the polynomial $p(\Delta x, \Delta y)$ at the location $(\Delta x, \Delta y)$.

This arrangement operates in accordance with the method described hereinbefore. For the arrangement, the fact that not all of the above-mentioned computations have to be repeated for computing a new pixel value, may be utilized to advantage.

Therefore, first computing means are provided in the arrangement, which set up the polynomial, compute the polynomials at the four reference pixel values and form the matrix and the inverse matrix. These means may be implemented in such a way that they perform these computations only once.

Furthermore, differentiators are provided which perform the required first derivations.

With the aid of second computing means, a searched pixel value $s_i(x_0+\Delta x, y_0+\Delta y)$ is computed in the manner described above. The computations performed by the computing means are to be repeated each time for one searched pixel value $s_i(x_0+\Delta x, y_0+\Delta y)$.

Dependent on their realization, the means for computing the polynomial, its values and the matrices may be implemented in such a way that they are realized in the computing means. This means that the computing means are implemented in such a way that the computations of the polynomial, its values and the matrices are implicitly realized in their structure.

The arrangement according to the invention is further characterized in that the differentiators in the frequency range for forming the $k^{th}$ derivative approximatively have the transfer function $H=(j\omega)^k$, in which $\omega$ is the local frequency in the x-direction or the y-direction, dependent on whether the derivative is to be realized in the x-direction or the y-direction. A very good approximation of the derivative values is achieved by this implementation of the transfer function.

In accordance with a further embodiment of the invention, the differentiators comprise successively arranged delay elements, and that adders are provided which receive, within the differentiator, each time those signals which are multiplied by coefficients of the same value, the adders preceding a multiplier performing the multiplication by the allocated coefficients, and the output signals from the multipliers are added by means of an adder which supplies the output signal of the differentiator.

Since the above-mentioned transfer function can be performed by multiplication of pixel values delayed by several values and since pixel values delayed by several values are to be multiplied by the same coefficients, this differentiator structure limits the number of components to a maximal extent.

A further embodiment of the arrangement according to the invention is characterized in that the values $s(x_0\pm n, y_0 \pm m)$ are applied to a series arrangement of line memories whose output signals supply pixel values $s(x_0+3, y_{0+}2)$, $s(x_0+3, y_0+1)$, ..., $s(x_0+3, y_0-3)$, a first delay element is provided which receives the pixel value $s(x_0+3, y_0+1)$ and supplies the pixel value $s(x_0+1, y_0+1)$ from its output, a second delay element is provided which receives the pixel value $s(x_0+1, y_0+1)$ and supplies the pixel value $s(x_0, y_0+1)$ from its output, a third delay element is provided which receives the pixel value $s(x_0+3, y_0)$ and supplies the pixel value $s(x_0+1, y_0)$ from its output, a fourth delay element is provided which receives the pixel value $s(x_0+1, y_0)$ and supplies the pixel value $s(x_0, y_0)$ from its output, a first differentiator is provided which receives the pixel values $s(x_0+3, y_0+3)$, $s(x_0+3, y_0+2)$, ..., $s(x_0+3, y_0-3)$ and performs a first derivation $\delta s(x,y)/\delta y|(x_0+3, y_0)$ of the pixel value $s(x_0+3, y_0)$ in the y-direction, a fifth delay element is provided which receives the first derivative in the y-direction at the location $(x_0+3, y_0)$ and supplies from its output the third derivative of the pixel values in the y-direction at the location $(x_0, y_0)$, a second differentiator is provided which receives the pixel value $s(x_0+3, y_0)$ and performs a first derivation $\delta s(x,y)/\delta x|(x_0, y_0)$ of the pixel value in the x-direction, the computing circuit comprises a superposition stage by means of which the pixel values and first derivatives $s(x_0, y_0)$, $s(x_0, y+1)$, $s(x_0+1, y_0)$, $s(x_0+1, y_0+1)$, $\delta s(x,y)/\delta x|(x_0, y_0)$ and $\delta s(x,y)/\delta y|(x_0, y_0)$ are superimposed in accordance with the inverse matrix in such a way that the superposition stage supplies the coefficients from its output, the computing circuit comprises multipliers by means of which the coefficients are multiplied by the polynomial basic functions which are generated from $\Delta x$ and $\Delta y$, and the output signals from the multiplier are added by means of an adder stage in the computing circuit, which adder stage supplies the value of the searched pixel $s_i(x_0+\Delta x, y_0+\Delta y)$ from its output.

This arrangement consisting of the line memories, the delay elements and the differentiators supplies the required values to the second computing circuit which requires these values for setting up the observation vector. The computation of the coefficients is then performed by corresponding fixed combinations in the superposition stage. The superposition stage supplies the coefficients of the polynomial from its output. The coefficients are subsequently multiplied by the polynomial basic functions which are generated from $\Delta x$ and $\Delta y$ of the searched pixel value $s_i$. The combination of these products by means of the adder stage then yields the searched pixel value $s_i(x_0+\Delta x, y_0+\Delta y)$.

In this arrangement, the first computing means are integrated in the second computing means in such a way that the second computing circuit and its superposition stage have such a structure that implicitly a computation of the values in accordance with the polynomial or its k first derivatives is performed. Moreover, the combinations in the superposition stage are chosen to be such that the inverse or pseudo-inverse matrix is realized by predetermined combinations of the pixel values or their first derivatives.

In this arrangement, the first computing circuit does not explicitly appear but is realized by the structure of the second computing circuit. This is possible because the computations of the first computing circuit do not need to be individually performed for pixel values but represent general computing prescriptions which can be realized by the structure of the second computing circuit.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE PREFERRED EMBODIMENTS

Figure 1:
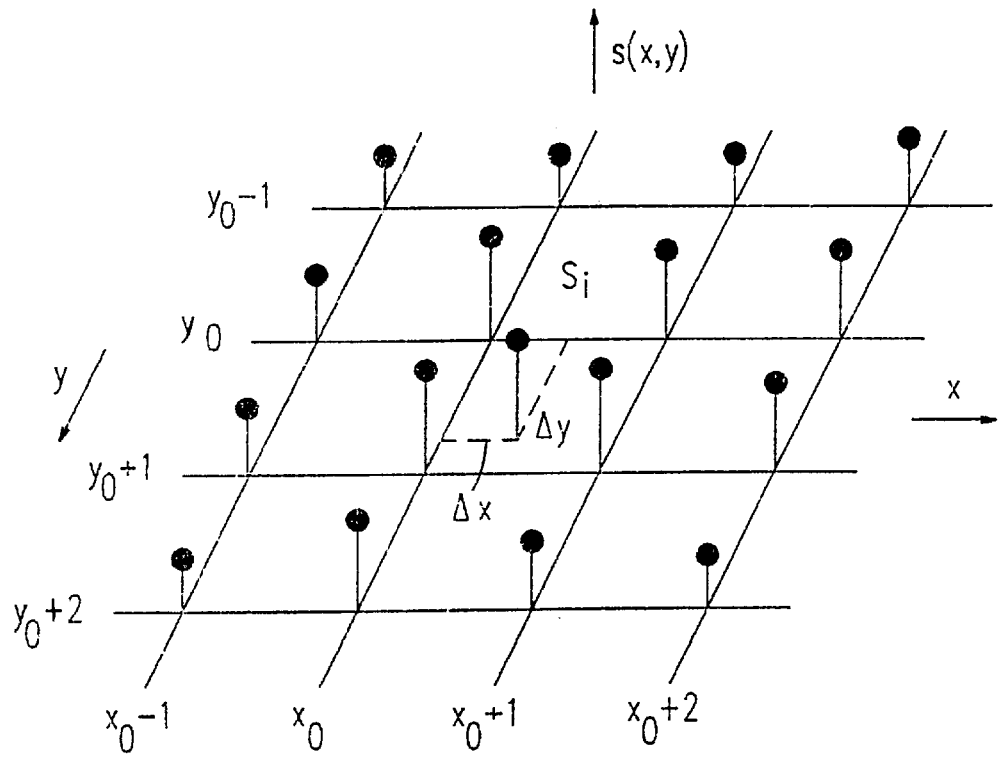
FIG. 1 shows diagrammatically a two-dimensional scanning raster with one searched pixel value and four reference pixel values.

FIG. 1 shows a two-dimensional scanning raster with pixel values $s(x,y)$. The section of the scanning raster of FIG. 1 shows raster points $x_0-1$, $x_0$, $x_0+1$ and $x_0+2$ in the x-direction. In the y-direction, this scanning raster shows raster values $y_0-1$, $y_0$, $y_0+1$ and $y_0+2$.

It is assumed that a pixel value $s_i(x_0+\Delta x, y_0+\Delta y)$ is searched. The searched pixel value $s_i$ is thus arranged within a square which has reference pixel values $s(x_0, y_0)$, $s(x_0, y_0+1)$, $s(x_0+1, y_0)$ and $s(x_0+1, y_0+1)$.

Independent of the fact that where the searched pixel value $s_i$ is actually located within the two-dimensional raster, its location in the two-dimensional scanning raster is always computed on the basis of a reference pixel $s(x_0, y_0)$. This means that the pixels arranged around the searched pixel $s_i$ always have the above-mentioned raster values.

Figure 2:
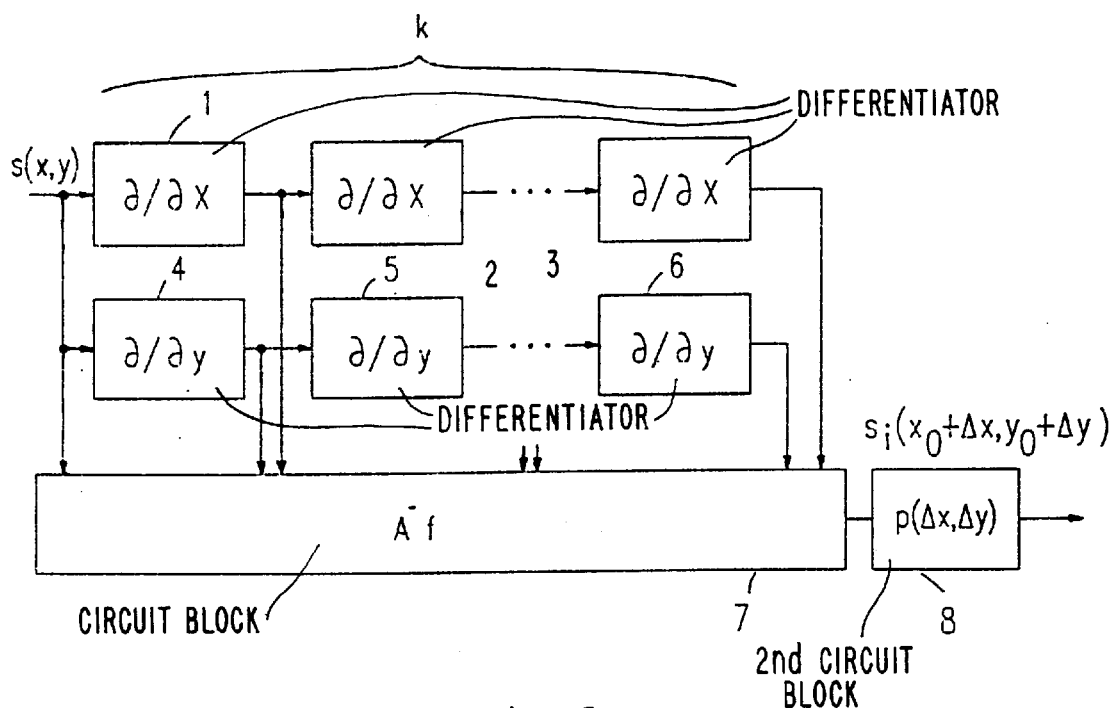
FIG. 2 shows diagrammatically the mode of operation of an arrangement for computing pixel values.

FIG. 2 shows a coarse block diagram of an arrangement for computing the searched pixel value $s_i$. The values of the pixels of the two-dimensional scanning raster s(x,y) are applied to differentiators 1, 2 to 3 arranged one behind the other in the arrangement and performing a derivation of the received pixel values in the x-direction. An overall number of k such differentiators may be provided. Furthermore, the differentiators 4, 5 to 6 are provided which perform derivations of the received pixel values in the y-direction of the two-dimensional scanning raster. Here again, as many differentiators 4 to 6 are provided as first derivations are to be performed.

The output values of all differentiators 1 to 6 are applied to a circuit block 7 which forms an observation vector from the values of the reference pixel values themselves as well as from their k first derivatives.

Furthermore, a polynomial of the form $$p(x,y) = c_{m-1}x^{am-1}y^{bm-1} + c_{m-2}x^{am-2}y^{bm-2} + \ldots + c_2x + c_1y + c_0$$

is set up in the circuit block 7. A matrix is also formed, whose elements consist of the values of the basic functions $$x^{am-1}y^{bm-1}, x^{am-2}y^{bm-2}, \ldots, x, y, 1$$

of the polynomial at the reference pixels and the k first derivatives. The basic functions allocated to the reference pixel or to one of the k first derivatives of a reference pixel are arranged within a row of the matrix. In the arrangement, an inverse or pseudo-inverse matrix $A^{31}$ is formed from this matrix. This matrix is multiplied by the observation vector and supplies the polynomial coefficients $c_{m-1}, c_{m-2}, \ldots, c_2, c_1, c_0$ at its output. This signal represents the output signal of the circuit block 7 which is applied to a second circuit block 8 in which a computation of the above-mentioned polynomial is performed for the searched pixel value $s_i(x_0+\Delta x, y_0+\Delta y)$ in that the coefficients are introduced into the polynomial and the function value of the polynomial is determined by introducing the values $\Delta x$ and $\Delta y$. The result of this polynomial thus computed yields the pixel value $s_i(x_0+\Delta x, y_0+\Delta y)$.

The above-mentioned polynomial of the form $$p(x,y) = c_{m-1}x^{am-1}y^{bm-1} + c_{m-2}x^{am-2}y^{bm-2} + \ldots + c_2x + c_1y + c_0$$

should maximally approximate the values of the four reference pixels $s(x_0,y_0)$, $s(x_0,y_0+1)$, $s(x_0+1,y_0)$ and $s(x_0+1,y_0+1)$. Moreover, the k first derivatives of this polynomial at at least one of the reference pixels should maximally approximate the k first derivatives of the values of the corresponding reference pixels.

This will be explained hereinafter, assuming that for the computation of a searched pixel $s_i(x_0+\Delta x, y_0+\Delta y)$ the four reference pixel values $s(x_0,y_0)$, $s(x_0,y_0+1)$, $s(x_0+1,y_0)$ and $s(x_0+1,y_0+1)$ arranged around this searched pixel are used for this computation. Moreover, only the first derivative of the reference pixel $s(x_0,y_0)$ in the x and y-directions are used.

A matrix is formed whose elements consist of the values of the basic functions $$x^{am-1}y^{bm-1}, x^{am-2}y^{bm-2}, \ldots, x, y, 1$$

of the polynomial and the four reference pixel values and the first derivative of the basic functions of the polynomial at the reference pixel value $s(x_0,y_0)$. The basic functions are arranged line-sequentially for the four reference pixel values and the first derivatives in the x and y-directions.

For the general case in which $\delta p(x,y)/\delta x$ and $\delta p(x,y)/\delta y$ are used for the polynomial $p(x,y)$ and for the first derivatives, it should hold that:

$$\begin{pmatrix} p(x, y) \\ \dfrac{\partial p(x, y)}{\partial x} \\ \dfrac{\partial p(x, y)}{\partial y} \end{pmatrix} = \begin{pmatrix} x^2 & y^2 & xy & x & y & 1 \\ 2x & 0 & y & 1 & 0 & 0 \\ 0 & 2y & x & 0 & 1 & 0 \end{pmatrix} \begin{pmatrix} c_5 \\ c_4 \\ \cdot \\ \cdot \\ c_0 \end{pmatrix} \quad (1)$$

This equation may be set up in this form because the basic functions which are present in the matrix and are multiplied by the allocated polynomial coefficients should yield the polynomials and the derivatives of the polynomials again.

For the special, simplified case in which the above-mentioned four reference pixels and the first derivatives of one of the reference pixels are used for computing a pixel value $s_i$, this equation is as follows:

$$\begin{pmatrix} p(0, 0) \\ p(1, 0) \\ p(0, 1) \\ p(1, 0) \\ \partial p(x, y)/\partial x|_{(0,0)} \\ \partial p(x, y)/\partial y|_{(0,0)} \end{pmatrix} = \begin{pmatrix} 0 & 0 & 0 & 0 & 0 & 1 \\ 1 & 0 & 0 & 1 & 0 & 1 \\ 0 & 1 & 0 & 0 & 1 & 1 \\ 1 & 1 & 1 & 1 & 1 & 1 \\ 0 & 0 & 0 & 1 & 0 & 0 \\ 0 & 0 & 0 & 0 & 1 & 0 \end{pmatrix} \begin{pmatrix} c_5 \\ c_4 \\ c_3 \\ c_2 \\ c_1 \\ c_0 \end{pmatrix} \quad (2)$$

By using the reference pixel values and the first derivatives of one of the reference pixel values in the basic functions, the matrix is simplified in which there are only zeros and ones left.

For the special case assumed for this equation in which only the values of the four reference pixels and the first derivatives in the x and y-directions of one of the reference pixel values are used, the above-mentioned polynomial can be simplified to the form $$p(x,y) = c_5x^2 + c_4y^2 + c_3xy + c_2x + c_1y + c_0 \quad (3)$$

Since in the equation (2) shown above, the coefficients $c_0$ to $c_5$ are initially unknown, the equation (2) is solved in accordance with the vector with the coefficients $c_5$ to $c_0$. Then the following equation is obtained $$\begin{pmatrix} c_5 \\ c_4 \\ c_3 \\ c_2 \\ c_1 \\ c_0 \end{pmatrix} = \begin{pmatrix} -1 & 1 & 0 & 0 & -1 & 0 \\ -1 & 0 & 1 & 0 & 0 & -1 \\ 1 & -1 & -1 & 1 & 0 & 0 \\ 0 & 0 & 0 & 0 & 1 & 0 \\ 0 & 0 & 0 & 0 & 0 & 1 \\ 1 & 0 & 0 & 0 & 0 & 0 \end{pmatrix} \begin{pmatrix} p(0, 0) \\ p(1, 0) \\ p(0, 1) \\ p(1, 0) \\ \partial p(x, y)/\partial x|_{(0,0)} \\ \partial p(x, y)/\partial y|_{(0,0)} \end{pmatrix} \quad (4)$$

Since the polynomial should maximally approximate the values of the reference pixels and the first derivatives in the manner described above, equation (4) can be written as:

$$\begin{pmatrix} c_5 \\ c_4 \\ c_3 \\ c_2 \\ c_1 \\ c_0 \end{pmatrix} = \begin{pmatrix} -1 & 1 & 0 & 0 & -1 & 0 \\ -1 & 0 & 1 & 0 & 0 & -1 \\ 1 & -1 & -1 & 1 & 0 & 0 \\ 0 & 0 & 0 & 0 & 1 & 0 \\ 0 & 0 & 0 & 0 & 0 & 1 \\ 1 & 0 & 0 & 0 & 0 & 0 \end{pmatrix} \begin{pmatrix} s(x_0, y_0) \\ s(x_0 + 1, y_0) \\ s(x_0, y_0 + 1) \\ s(x_0 + 1, y_0 + 1) \\ \partial s(x, y)/\partial x|_{x_0, y_0} \\ \partial s(x, y)/\partial y|_{(x_0, y_0)} \end{pmatrix} \quad (5)$$

In this equation, the matrix set up with the basic functions is now an inverse or pseudo-inverse matrix. The vector comprising the pixel values and their first derivatives as elements will hereinafter be referred to as observation vector. By multiplication of this observation vector with the inverse or pseudo-inverse matrix, the vector can be computed with the polynomial coefficients $c_5$ to $c_0$.

When the polynomial coefficients $c_5$ to $c_0$ are known, they can be introduced into the polynomial $$p(x,y)=c_5x^2+c_4y^2+c_3xy+c_2x+c_1y+c_0$$

For computing a searched pixel $s_i(x_0+\Delta x,y_0+\Delta y)$, these values should then be introduced into the polynomial so that:

$$s_i(x_0+\Delta x,y_0+\Delta y)=c_5\Delta x^2+c_4\Delta y^2+c_3\Delta x\Delta y+c_2\Delta x+c_1\Delta y+c_0. \qquad (6)$$

In the coefficients $c_5$ to $c_0$ which are now known, the searched pixel value $s_i$ can then be computed directly.

Figure 3:
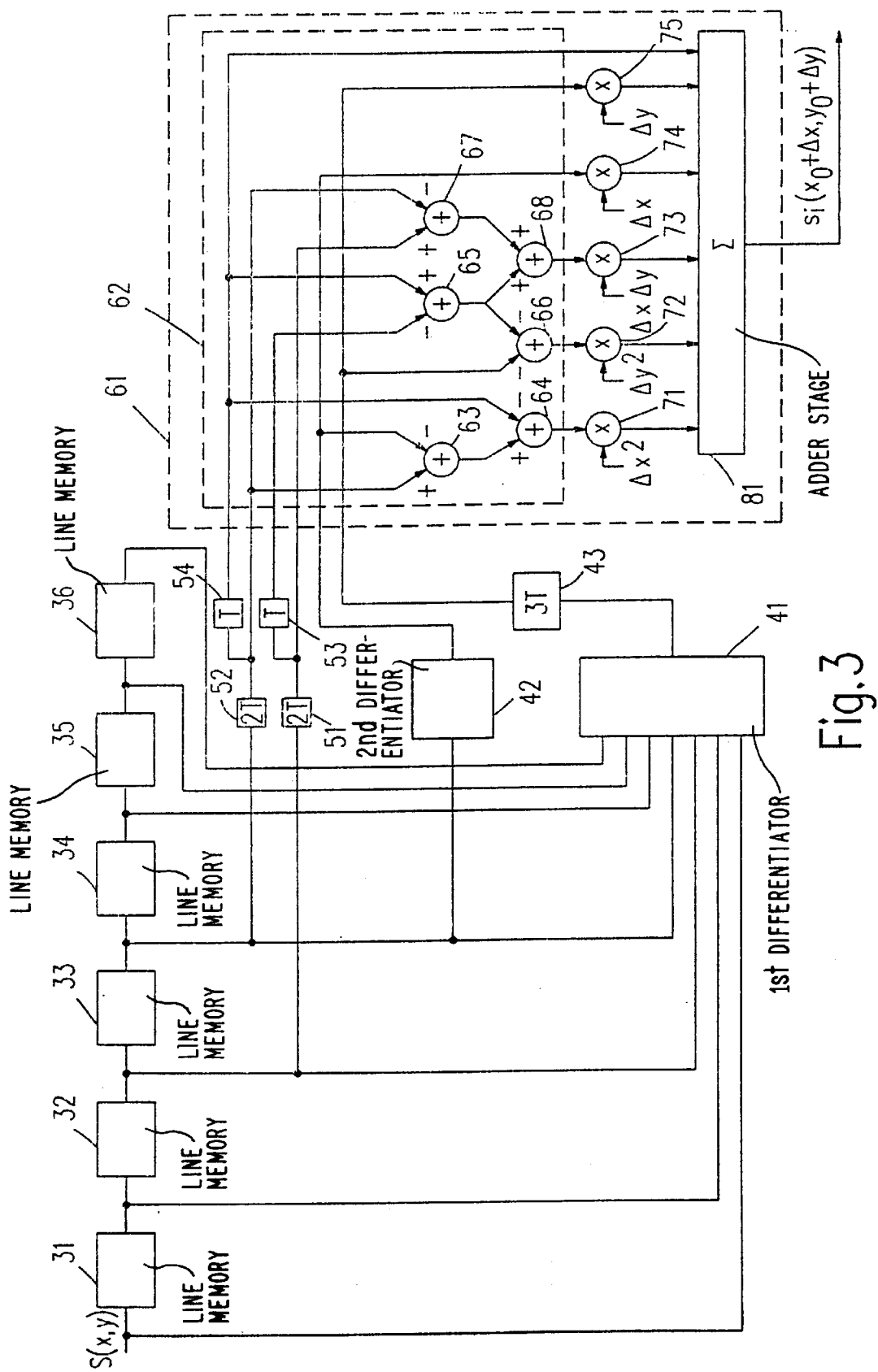
FIG. 3 is a block diagram of an arrangement for computing pixel values according to the invention.

FIG. 3 is a block diagram of an arrangement according to the invention computing the pixel value $s_i$ in accordance with this example in which the four reference pixel values $s(x_0,y_0),s(x_0+1,y_0),s(x_0,y_0+1)$ and $s(x_0+1,y_0+1)$ surrounding the searched pixel are used for computing the pixel value $s_i$. Moreover, the first derivative in the x and y-directions of the reference pixel value $s(x_0,y_0)$ is introduced.

The pixel values $s(x,y)$ present in the two-dimensional scanning raster of FIG. 1 are applied to three line memories 31 to 36 arranged one behind the other in the arrangement of FIG. 3. The line memories 31 to 36 perform a delay by a period of one picture line so that they supply pixels of the same x value at the output, which pixels have an y value which is smaller than a given value, i.e. they are each time located one line higher in the same horizontal position.

When the output value of the line memory 33 is used as value $s(x_0+3,y_0)$, the following pixel values are provided:
the pixel value $s(x_0+3,y_0+3)$ is present at the input of the line memory 31, the value $s(x_0+3,y_0+2)$ is present at the output of the line memory 31, the value $s(x_0+3,y_0+1)$ is present at the output of the line memory 32, the value $s(x_0+3,y_0-1)$ is present at the output of the line memory 34, the pixel value $s(x_0+3,y_0-2)$ is present at the output of the line memory 35, and the pixel value $s(x_0+3,y_0-3)$ is present at the output of the line memory 36.

All of these pixel values are applied to a first differentiator 41 which performs a derivation of the pixel values in the y-direction, the derivation being performed on the basis of the pixel value $s(x_0+3,y_0)$.

Subsequently, a delay member 43 is provided which delays the derivation of the pixel values in the y-direction at the position $(x_0+3,y_0)$ by a period of three pixel values so that the derivation of the pixel values in the y-direction is present at the output at the position $(x_0,y_0)$.

Furthermore, two delay elements 51 and 52 are provided, each performing a delay by a period of two pixel values, thus generating a delay by two values in the x-direction of the two-dimensional scanning raster.

The first delay element 51 receiving the pixel value $s(x_0+3,y_0+1)$ supplies a pixel value $s(x_0+1,y_0+1)$ at the output.

The second delay element, which receives the pixel value $s(x_0+3,y_0)$ at the input, supplies the value $s(x_0+1,y_0)$ at the output.

Moreover, two further delay elements 53 and 54 are provided, each performing a delay by a period of one pixel value, thus generating a delay by one value in the x-direction of the two-dimensional scanning raster.

The third delay element 53, which receives the pixel value $s(x_0+1,y_0+1)$, then supplies a pixel value $s(x_0,y_0+1)$ at the output. The fourth delay element 54, which receives the pixel value $s(x_0+1,y_0)$ at the input, supplies the value $s(x_0,y_0)$ at the output.

The value $s(x_0,y_0)$ supplied by the second delay element 52 is applied to a second differentiator 42 which performs a first derivation in the x-direction at the location of this pixel.

The arrangement of FIG. 3 further comprises computing means 61 which are provided with a superposition stage 62.

The superposition stage 62 receives the output signals from the differentiator 42, the output signals from the delay elements 51 to 54, as well as the output signal from the delay element 43.

The values $s(x_0,y_0)$, $s(x_0+1,y_0)$, $s(x_0,y_0+1)$, $s(x_0+1,y_0+1)$ as well as the first derivative of the pixel value $s(x_0,y_0)$ in the x and y-directions are thereby available at the input of the superposition stage.

These are the values of the vector in accordance with equation (4) which, multiplied by the inverse matrix of this equation, yield the vector with the polynomial coefficients $c_5$ to $c_0$.

A further consideration of this equation (5) shows that, for example, the polynomial coefficient $c_5$ results from the sum $-s(x_0,y_0)$, $s(x_0+1,y_0)$ and $-\Delta s(x,y)/\delta x$ at the location $(x_0,y_0)$. In a corresponding manner, the coefficients $c_4$ to $c_0$ are obtained by corresponding inverse matrix superposed values or inverted values of the observation vector in equation (5).

This coherence between the pixel values of the observation vector and the polynomial coefficients is shown in the computing means 61 by a corresponding connection of adders 63 to 68 within the superposition stage 62.

For example, for the polynomial coefficient $c_5$ taken as an example hereinbefore, the adders 63 and 64 are provided which perform a superposition of the input values in accordance with the prescription indicated by the inverse matrix in equation (5). The adder 63 receives the output signal from the second differentiator 42 at an inverting input, which differentiator supplies the signal $-s(x,y)/\delta x$ at the location $(x_0,y_0)$. The signal $s(x_0+1,y_0)$ is applied to a non-inverting input of the adder 63. The output signal of the adder 63 is applied to a non-inverting input of the adder 64. The signal $s(x_0,y_0)$ is applied to an inverting input of the adder 64.

The adder 64 thereby supplies the coefficient $c_5$ at the output, in accordance with equation (5).

In a corresponding manner, the adders 65 and 66 are provided for generating the polynomial coefficient $c_4$, the adders 65, 67 and 68 are provided for generating the polynomial coefficient $c_3$. In accordance with the inverse matrix in equation (5), the polynomial coefficient $c_2$ directly results from the value $-s(x,y)/\delta x$ at the location $(x_0,y_0)$, i.e. from the value of the second differentiator 42. The polynomial coefficient $c_1$ directly results from the value $-s(x,y)/\delta y$ at the location $(x_0,y_0)$, i.e. from the value of the delay member 43. The polynomial coefficient $c_0$ corresponds to the pixel value $s(x_0,y_0)$.

The superposition stage 62 thereby supplies the polynomial coefficients $c_5$ to $c_0$ at the output.

Since the pixel value $s_i(x_0+\Delta x,y_0+\Delta y)$ is obtained by introducing the values $\Delta x$ and $\Delta y$ into the polynomial, the equation (6) is now valid, which is computed within the computing means 61 by multiplying the polynomial coefficients $c_5$ to $c_0$ by the allocated basic functions at the locations $\Delta x$ and $\Delta y$. Thus, the multiplier 71 multiplies the polynomial coefficient $c_5$ by the value $\Delta x^2$, the multiplier 72 multiplies the polynomial coefficient $c_4$ by the basic function $\Delta y^2$, the multiplier 73 multiplies the polynomial coefficient $c_3$ by the basic function $\Delta x \cdot \Delta y$, the multiplier 74 multiplies the polynomial coefficient $c_2$ by the basic function $\Delta x$ and the multiplier 75 multiplies the polynomial coefficient $c_1$ by the basic function $\Delta y$. Since $c_0$ should be multiplied only by 1, a multiplier is not necessary in this case.

The polynomial coefficient $c_0$ as well as the output values of the multipliers 71 to 75 are applied to an adder stage 81 which supplies the value $s_i(x_0+\Delta x,y_0+\Delta y)$ of the searched pixel at the output, in conformity with equation (6).

In the arrangement of FIG. 3, the computing instruction in conformity with the polynomial and the inverse matrix is contained in the implementation of the superposition stage. The searched pixel values $s_y$ can be directly and continuously computed thereby from the input signal $s(x,y)$ of the arrangement of FIG. 3. This may be done very accurately on the basis of the method according to the invention, with the number of components in the arrangement of FIG. 3 remaining relatively small.

The differentiators 41 and 42 shown as a block in FIG. 3 preferably have a transfer function $H=(j\omega)^k$, in which $\omega$ is the local frequency in the x or the y-direction, dependent on whether the derivation should be effected in the x or the y-direction.

This transfer function may be realized, for example, by a filter which has the filter coefficients 13/128, −40/128, 115/128, 0/128, −115/128, 40/128 and −13/128.

Figure 4:
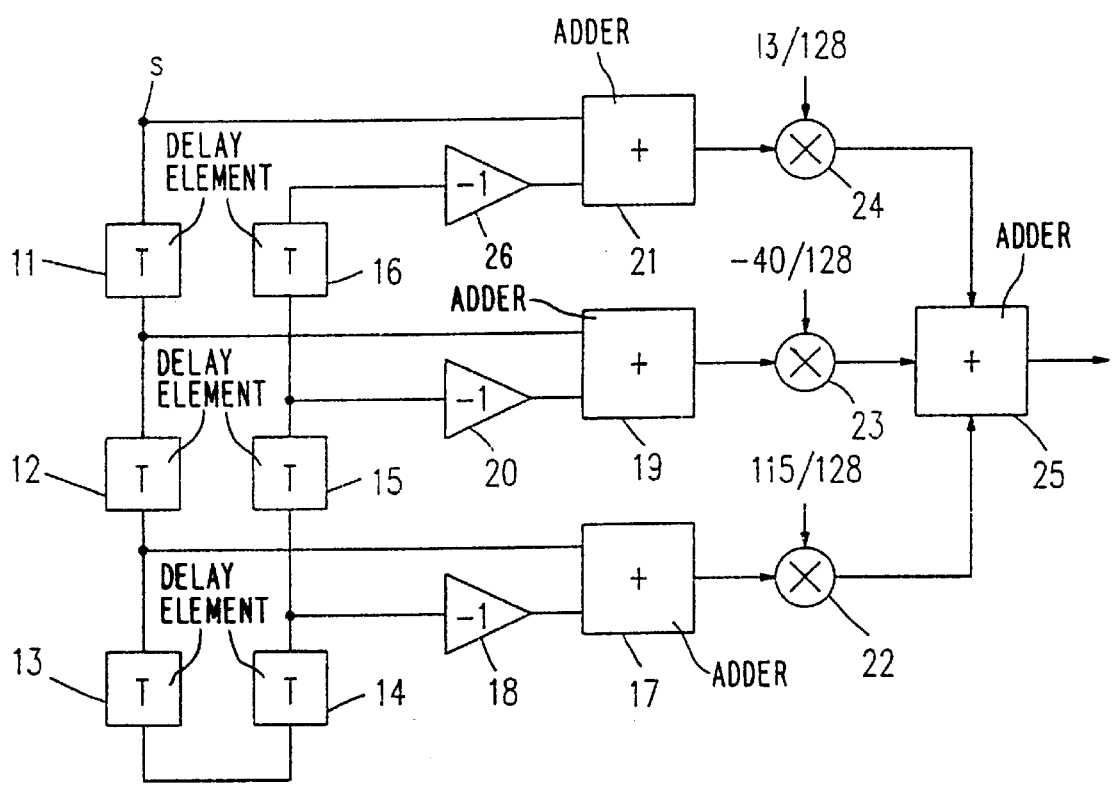
FIG. 4 is a block diagram of a differentiator which can be used in the arrangement of FIG. 3 for computing pixel values.

This filter is realized by a corresponding circuit in FIG. 4.

The filter shown in FIG. 4 has six delay elements 11 to 16 which are arranged one behind the other, and in which the first delay element 11 receives the input signal to be differentiated. In conformity with the filter coefficients to be selected, the input signal as well as the output signal from the last delay element 16, inverted by means of an inverter 26, is applied to an adder 21 because both are to be multiplied in a non-inverted and an inverted form by the factor 13/128. This is realized by means of a multiplier 24 arranged subsequent to the adder 21.

In conformity with the filter coefficients mentioned above, the output signals from the first delay element 11 and the fifth delay element 15 are superposed in a non-inverted and an inverted form by means of a summing device 19 and multiplied by the filter coefficient −40/128. Similarly, the output signals from the second delay element 12 and the fourth delay element 14 are applied in a non-inverted form and in a form inverted by means of an inverter 18 to an adder 17 whose output signal is multiplied by the allocated filter coefficient 115/128 by means of a multiplier.

The output values of the multipliers 22 to 24 are superposed by means of an adder 25 so that the overall arrangement of FIG. 4 has a filter behavior which is a good approximation of the above-mentioned transfer function.

Such differentiators can be used in the circuit of FIG. 3. The delay elements within the differentiator are provided for the differentiation in the x-direction. The delay elements in the arrangement of FIG. 3 are externally built up as line memories 31 to 36 for the delay in the y-direction. In this case, the input signal and the output signals of the line memories 31 to 36 should be applied in a corresponding manner to the adders 17, 19 and 21 in a non-inverted and an inverted form, without passing through the delay elements 11 to 16.

Moreover, the delay time of the vertical differentiator 41 in FIG. 3 is to be matched with the delay time of the horizontal differentiator 42 by means of a delay member 43 which realizes a horizontal delay of three pixels, so that the horizontal derivative of the input signal $s(x,y)$ at the point $(x_0,y_0)$ is present at the output of the differentiator 42, and the vertical derivative of the input signal $s(x,y)$ at the same point $(x_0,y_0)$ is present at the output of the delay member 43.

I claim:

1. A method of computing values $s_i(x_0+\Delta x, y_0+\Delta y)$ of pixels which are arranged outside a two-dimensional scanning raster $\{x_0 \pm n, y_0 \pm m$, with $m,n=0,1,2,3, \ldots \}$ of pixels having pixel values $s(x_0 \pm n, y_0 \pm m)$ of a digital picture signal, comprising the steps of:

determining, for computing a searched pixel value $s_i(x_0+\Delta x, y_0+\Delta y)$, at least three pixel values $s(x_0, y_0)$, $s(x_0, y_0+1)$, $s(x_0+1, y_0)$, and $s(x_0+1, y_0+1)$ of four reference pixels arranged around the searched pixel;

constituting a polynomial $p(x,y)$ of the form $$p(x,y)=c_{m-1}x^{am-1}y^{bm-1}+c_{m-2}x^{am-2}y^{bm-2}+\ldots+c_2x+c_1y+c_0$$

which, at the positions of at least three of the four reference pixels should correspond to their values, so that $p(0,0)=s(x_0,y_0), p(1,0)=s(x_0+1,y_0), p(0,1)=s(x_0, y_0+1)$ and/or $p(1,1)=s(x_0+1,y_0+1)$;

forming the k first derivatives $\delta s(x,y)/\delta x$ in the x-direction and $\delta s(x,y)/\delta y$ in the y-direction from at least one of the reference pixel values;

forming a matrix, whose elements consist of the values of the basic functions $x^{am-1}y^{bm-1}, x^{am-2}y^{bm-2}, \ldots x, y, 1$ of the polynomial at at least three of the reference pixels and the k first derivatives $\delta p(x,y)/\delta x$ in the x-direction and $\delta p(x,y)/\delta y$ in the y-direction of the basic functions at least one of the reference pixel values, wherein the basic functions being allocated to a reference pixel or to a first derivative of a reference pixels being in one row of the matrix;

forming an inverse or pseudo-inverse matrix from the matrix by means of inversion;

multiplying the inverse or pseudo-inverse matrix by an observation vector for determining the polynomial coefficients $c_{m-1}, c_{m-2}, \ldots, c_2, c_1, c_0$, which vector comprises as elements at least three of the reference pixel values and the k first derivatives $\delta s(x,y)/\delta x$ in the x-direction and $\delta s(x,y)/\delta y$ in the y-direction of at least one of the reference pixel values; and introducing the polynomial coefficients into the polynomial $p(x,y)$ and computing the new pixel value $s_i(x_0+\Delta x, y_0+\Delta y)$ by computing the function value of the polynomial $p(\Delta x, \Delta y)$ at the location $(\Delta x, \Delta y)$.

2. A method as claimed in claim 1, wherein, in the step of forming the matrix, forming the first derivatives $\delta p(x,y)/\delta x$ in the x-direction and $\delta p(x,y)/\delta y$ in the y-direction from the reference pixel value $s(x_0, y_0)$, and wherein the observation factor comprises the four reference pixel value $s(x_0,y_0)$, $s(x_0,y_0+1)$, $s(x_0+1,y_0)$ and $s(x_0+1,y_0+1)$, and forming the first derivatives $\delta s(x,y)/\delta x$ in the x-direction and $\delta s(x,y)/\delta y$ in the y-direction from the reference pixel value $s(x_0,y_0)$.

3. An arrangement for computing values $s_i(x_0+\Delta x, y_0+\Delta y)$ of pixels which are arranged outside a two-dimensional scanning raster $\{x_0 \pm n, y_0 \pm m$, with $m,n=0,1,2,3, \ldots \}$ of pixels having pixel values $s(x_0 \pm n, y_0 \pm m)$ of a digital picture signal, comprising:

first computing means which:

constitute a polynomial $p(x,y)$ of the form $p(x,y)=c_{m-1}x^{am-1}y^{bm-1}+c_{m-2}x^{am-2}y^{bm-2}+\ldots+c_2x+c_1y+c_0$ which, at the positions of at least three of the four reference pixels should correspond to their values, so that $p(0,0)=s(x_0,y_0), p(1,0)=s(x_0+1,y_0)$, $p(0,1)=s(x_0, y_0+1)$ and/or $p(1,1)=s(x_0+1, y_0+1)$, form a matrix whose elements consist of the values of the basic functions $x^{am-1}y^{bm-1}, x^{am-2}y^{bm-2} \ldots x, y, 1$ of the polynomial at at least three of the reference pixels and the k first derivatives $\delta p(x,y)/\delta x$ in the x-direction and $\delta p(x,y)/\delta y$ in the y-direction of the basic functions at least one of the reference pixel values, wherein the basic functions are allocated to a reference pixel or to a first derivative of a reference pixels being in one row of the matrix, form an inverse or pseudo-inverse matrix from the matrix by means of inversion;

first and second differentiators which form the k first derivatives $\delta s(x,y)/\delta x$ in the x-direction and $\delta s(x,y)/\delta y$ in the y-direction, respectively, from at least one of the reference pixel values; and second computing means which:

for computing a searched pixel value $s_i(x_0+\Delta x, y_0+\Delta y)$, receive at least three pixel values $s(x_0,y_0)$, $s(x_0,y_0+1)$, $s(x_0+1,y_0)$ and $s(x_0+1,y_0+1)$ of four reference pixels arranged around the searched pixel, multiply the inverse or pseudo-inverse matrix by an observation vector for determining the polynomial coefficients $c_{m-1}, c_{m-2}, \ldots, c_2, c_1, c_0$, which vector comprises as elements at least three of the reference pixel values and the k first derivatives $\delta s(x,y)/\delta x$ in the x-direction and $\delta s(x,y)/\delta y$ in the y-direction of at least one of the reference pixel values, and introduce the polynomial coefficients into the polynomial $p(x,y)$ and compute the new pixel value $s_i(x_0+\Delta x, y_0+\Delta y)$ by computing the function value of the polynomial $p(\Delta x, \Delta y)$ at the location $(\Delta x, \Delta y)$.

4. An arrangement as claimed in claim 3, wherein the first and second differentiators in the frequency range for forming the $k^{th}$ derivative approximately have the transfer function $H=(j\omega)^k$, in which $\omega$ is the local frequency in the x-direction or y-direction, dependent on whether the derivative is to be realized in the x-direction or the y-direction.

5. An arrangement as claimed in claim 3, wherein the first differentiator comprises successively arranged delay elements and that adders are provided which receive, within the first differentiator, each time those signals which are multiplied by coefficients of the same value, the adders preceding a multiplier performing the multiplication by the allocated coefficients, and the output signals from the multipliers are added by means of another adder which supplies the output signal of the first differentiator, and the second differentiator, which has the same structure as the first differentiator, receives the input and the output signals from line memories as input signals for the inverted or non-inverted inputs of the adders.

6. An arrangement as claimed in claim 3, wherein:

the values $s(x_0 \pm n, y_0 \pm m)$ are applied to a series arrangement of line memories whose output signals supply pixel values $s(x_0+3,y_0+2)$, $s(x_0+3,y_0+1)$, ..., $s(x_0+3,y_0-3)$;

a first delay element is provided which receives the pixel value $s(x_0+3,y_0+1)$ and supplies the pixel value $s(x_0+1,y_0+1)$ from its output;

a second delay element is provided which receives the pixel value $s(x_0+1,y_0+1)$ and supplies the pixel value $s(x_0,y_0+1)$ from its output;

a third delay element is provided which receives the pixel value $s(x_0+3,y_0)$ and supplies the pixel value $s(x_0+1,y_0)$ from its output;

a fourth delay element is provided which receives the pixel value $s(x_0+1,y_0)$ and supplies the pixel value $s(x_0,y_0)$ from its output;

the first differentiator receives the pixel values $s(x_0+3, y_0+3)$, $s(x_0+3,y_0+2)$, ..., $s(x_0+3,y_0-3)$ and performs a first derivation $\delta s(x,y)/\delta y|(x_0+3,y_0)$ of the pixel value $s(x_0+3,y_0)$ in the y-direction;

a fifth delay element is provided which receives the first derivative in the y-direction at the location $(x_0+3,y_0)$ and supplies from its output the third derivative of the pixel values in the y-direction at the location $(x_0,y_0)$;

the second differentiator receives the pixel values $s(x_0+3,y_0)$ and performs a first derivation $\delta s(x,y)/\delta x|(x_0,y_0)$ of the pixel value $s(x_0+3,y_0)$ in the x-direction;

the second computing means comprises a superposition stage by means of which the pixel values and first derivatives $s(x_0,y_0)$, $s(x_0,y_0+1)$, $(x_0+1,y_0)$, $s(x_0+1,y_0+1)$ $\delta s(x,y)/\delta x|(x_0,y_0)$ and $\delta s(x,y)/\delta y|(x_0,y_0)$ are superimposed in accordance with the inverse matrix in such a way that the superposition stage supplies the coefficients from its output;

the second computing means further comprises multipliers by means of which the coefficients are multiplied by the polynomial basic functions which are generated from $\Delta x$ and $\Delta y$; and the output signals from the multiplier are added by means of an adder stage in the second computing means, which adder stage supplies the value of the searched pixel $s_i(x_0+\Delta x, y_0+\Delta y)$ from its output.

7. A method as claimed in claim 1, comprising converting a format of the digital picture signal.

* * * * *